US008038570B2

(12) United States Patent
Loeber (10) Patent No.: US 8,038,570 B2
(45) Date of Patent: Oct. 18, 2011

(54) AXIAL THRUST CONTROL FOR GEARING

(75) Inventor: Frederick W. Loeber, Casco, WI (US)

(73) Assignee: Bucyrus Mining Equipment, Inc., South Milwaukee, WI (US)

( * ) Notice: Subject to any disclaimer, the term of this patent is extended or adjusted under 35 U.S.C. 154(b) by 306 days.

(21) Appl. No.: 12/409,063

(22) Filed: Mar. 23, 2009

(65) Prior Publication Data

US 2010/0236848 A1    Sep. 23, 2010

(51) Int. Cl.
    *F16H 57/08* (2006.01)
(52) U.S. Cl. ........................................ 475/348
(58) Field of Classification Search ............... 475/330, 475/331, 348, 903; 74/606 R; 180/372
    See application file for complete search history.

(56) References Cited

U.S. PATENT DOCUMENTS

| | | | | |
|---|---|---|---|---|
| 3,937,293 A * | 2/1976 | Susdorf | .................. | 180/65.6 |
| 3,969,950 A * | 7/1976 | Rau et al. | .................. | 74/391 |
| 4,330,045 A | 5/1982 | Myers | | |
| 5,087,229 A * | 2/1992 | Hewko et al. | .................. | 475/149 |
| 5,398,776 A * | 3/1995 | Forster | .................. | 180/308 |
| 6,890,282 B2 * | 5/2005 | Oberstarr | .................. | 475/323 |
| 7,325,643 B2 * | 2/2008 | Shimizu et al. | .................. | 180/346 |
| 7,527,113 B2 * | 5/2009 | Jenkins | .................. | 180/65.51 |
| 2004/0259677 A1 * | 12/2004 | Shirokoshi | .................. | 475/330 |
| 2005/0250616 A1 | 11/2005 | Beltowski | | |

FOREIGN PATENT DOCUMENTS

JP    200837355 A    2/2008

OTHER PUBLICATIONS

Written Opinion of the International Searching Authority dated Dec. 9, 2010 for PCT/US2010/028288.
International Search Report dated Dec. 9, 2010 for PCT/US2010/028288.

* cited by examiner

*Primary Examiner* — J. Allen Shriver, II
*Assistant Examiner* — James M Dolak
(74) *Attorney, Agent, or Firm* — Foley & Lardner LLP

(57) ABSTRACT

An outboard thrust bearing assembly includes: a drawbolt, an inner end cap, an outer end cap, and at least one race of thrust bearings; the drawbolt for clamping the inner end cap to the outer end cap and about a pinion gear of a planetary gear, wherein the at least one race of outboard thrust bearings is retained in place by the outer end cap, the pinion gear, a planetary gear carrier and a hub cap. A wheel motor and a vehicle are disclosed.

9 Claims, 7 Drawing Sheets

AXIAL THRUST CONTROL FOR GEARING

BACKGROUND OF THE INVENTION

1. Field of the Invention

The invention disclosed herein relates to land vehicles and, in particular, to limiting axial thrust in wheel motors deployed in heavy equipment.

2. Description of the Related Art

Large trucks, such as those used for mining operations, are usually propelled using electric motorized wheel motors. The wheel motors are incorporated into a rear axle of the truck, with a wheel motor driving each dual wheel assembly. In typical wheel motor units, an electric motor is connected to a reduction gearcase, which, in turn, is fastened to a wheel assembly which includes tire and rim assemblies. Tractive power is initiated in the wheel motor while the gearcase functions as torque increaser/speed reducer. As one might imagine, the wheel motors used in large trucks (such as in mining operations) are subject to enormous amounts of wear and stress. Aside from rotational wear and stress, unintended axial thrust can present significant problems.

As an example, in some instances, the gearcase includes a two-stage planetary type gear assembly, with input provided by a floating pinion shaft/gear which is powered by the electric motor. Generally, each planetary stage includes a pinion gear, three planet gears and an outer ring gear.

Under severe torque loading, the planetary gear train can exhibit axial deflections in the meshing gears. These deflections tend to generate axial loading for individual gears and for the planetary stages as a whole. Forces, such as those that may be encountered during normal operation (as well as lateral shock loading), can cause the gearing to run out-of-position and suffer abnormal wear. This can lead to premature gearcase failure and unplanned maintenance events. Clearly, such events come at great expense both in terms of time and money for operators of the heavy equipment.

For the above-mentioned reasons, the gear train must have provisions designed into it to control axial forces and the harmful effects of premature wear. Typically, ball or roller bearings are fitted into the gearcase to control the axial forces in either direction.

In prior art, the bearings are distributed throughout the gearcase and are positioned to control thrust without interfering with the radial meshing of the gearing. Interference with the radial float could adversely load the bearing radially and lead to premature failure. Unfortunately, distribution of bearing assemblies throughout the gearcase results in additional manufacturing complexity and tolerance accumulations. Parts count would be higher and the gearcase would require a load bearing bulkhead.

Further, distribution of bearing assemblies in the gearcase also makes the manufacture of each wheel motor more involved, as the bearings must be fitted properly and in specific sequence. During normal maintenance, the bearings cannot be effectively monitored by simple inspection routines, as the bearings are obscured from view. Accordingly, evaluation of bearing wear requires significant disassembly and downtime.

Therefore, what is needed is improved method and apparatus for limiting axial thrust or deflection in the gearcase of a wheel motor. Preferably, the method and apparatus provide users and operators with simplified maintenance and support quick visual inspection with comparatively minimal effort.

BRIEF SUMMARY OF THE INVENTION

In one embodiment, the invention includes an outboard thrust bearing assembly includes: a drawbolt, an inner end cap, an outer end cap, and at least one race of thrust bearings; the drawbolt for clamping the inner end cap to the outer end cap and about a pinion gear of a planetary gear, wherein the at least one race of outboard thrust bearings is retained in place by the outer end cap, the pinion gear, a planetary gear carrier and a hub cap.

In a further embodiment, the invention includes a wheel motor includes a traction motor for driving an input shaft of a gearcase, the input shaft for driving a first stage planetary gear assembly, which in turn drives a secondary stage planetary gear assembly, and a outboard thrust bearing assembly for limiting axial thrust in the gearcase.

In an additional embodiment, the invention includes a vehicle including comprising at least one wheel motor, the wheel motor including a traction motor for driving an input shaft of a gearcase, the input shaft for driving a first stage planetary gear assembly, which in turn drives a secondary stage planetary gear assembly, and a outboard thrust bearing assembly for limiting axial thrust in the gearcase.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are method and apparatus for limiting axial deflection (also referred to as "axial thrust" or "axial motion") in a gearcase of a wheel motor, such as a wheel motor used in an off-road vehicle. Generally, the method and apparatus support quick visual inspection as well as simplified maintenance and repair or replacement with comparatively minimal effort. As a result, users are provided with wheel motors that are substantially more economic to operate than previously available.

Figure 1:
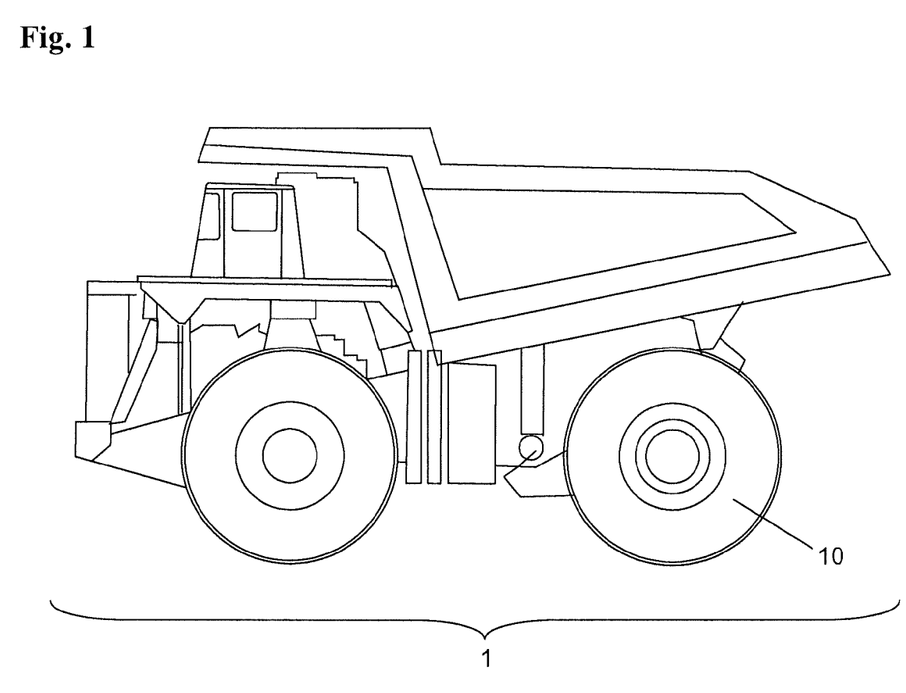
FIG. 1 is a side view of an off-road vehicle including a dual wheel assembly.

Referring to FIG. 1, there is shown an exemplary off-road vehicle 1, also referred to as a "truck," or as "heavy equipment" and by other similar terms. In this example, the off-road vehicle 1 includes a wheel motor 10 for each side of a rear axle. In this embodiment, each wheel motor 10 provides propulsion to the off-road vehicle 1. Generally, each wheel motor 10 is provided electric current from a power plant that is on-board the off-road vehicle 1. Of course, aspects of the off-road vehicle 1 provided herein merely serve as exemplary embodiments, and are not limiting of the invention.

As one might surmise, the off-road vehicle 1 may be any one of a variety of vehicles. Further, in some embodiments, such vehicles may be useful on a roadway, at least to some limited extent. Examples of heavy equipment that may make use of the wheel motor 10 include mining trucks, dump trucks, wheel loaders, scrapers, graders, diggers, dumpers, backhoes, handlers and the like.

Figure 2:
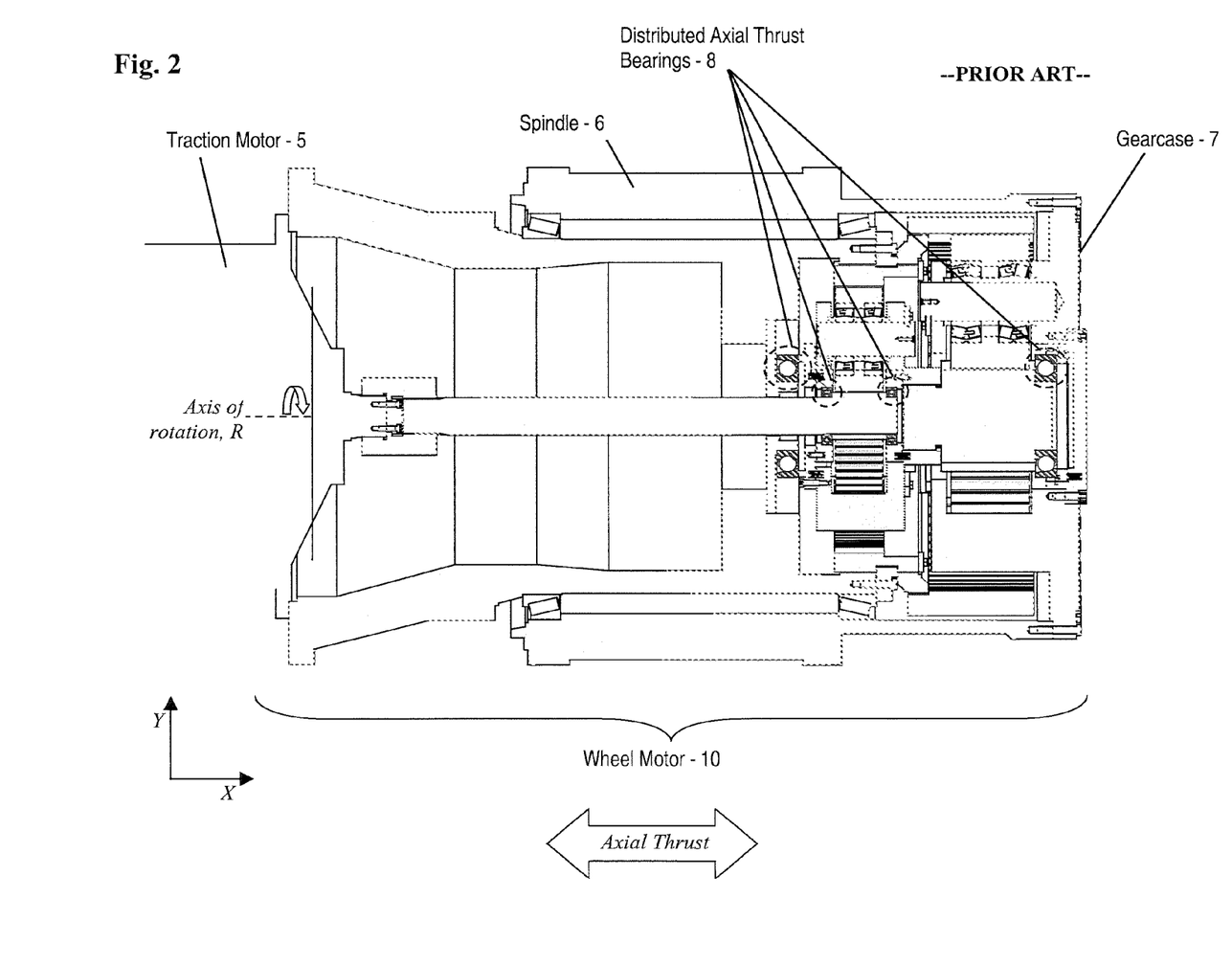
FIG. 2 is a cross-sectional view of a prior art wheel motor for propelling the vehicle of FIG. 1.

Referring now to FIG. 2, there is shown a partial cross-sectional view of a prior art embodiment of the wheel motor 10. In this example, the wheel motor 10 includes a traction motor 5 (generally, an electric motor providing a motive force) and a gearcase 7. The gearcase 7 translates the motive force provided by the traction motor 5 and provides rotational energy for a spindle 6. In turn, the spindle 6 turns a hub and a wheel assembly (not shown) in order to drive the vehicle 1.

As shown in FIG. 2, the prior art gearcase 7 includes a plurality of axial thrust bearings 8. That is, various races of bearings are included to limit axial motion (i.e., motion in either direction along a X-axis). The axial motion that commonly occurs in such vehicles is unintended and undesired motion of components.

Unfortunately, the embodiment of FIG. 2 is a complicated design. More specifically, a number of engineering challenges have resulted from incorporation of the plurality of thrust bearings 8 throughout the gearcase 7. These challenges include, for example, a balance of precisely limiting axial thrust, while providing a wheel motor 10 that has wide tolerances for operational conditions.

In addition, such designs often call for more field maintenance than is desired, and require significant expenditures of time and money for routine maintenance. For example, a task as simple as inspection of the plurality of axial thrust bearings 20 requires a disassembly of at least the gearcase 7. As one can imagine, this requires removing the vehicle 1 from service for extended periods of time.

Accordingly, a desire for simplification of prior art designs and elimination or reduction of the associated problems has inspired this invention. That is, and by way of example, in the prior art, distribution of thrust bearings throughout the gearcase has made it laborious to load or replace the bearings. The tight tolerances of prior art designs can be very unforgiving in light of the radial loads that may be experienced. A trend in prior art designs has been to address this with incorporation of additional parts and features within the gearcase. Of course, this has resulted in increased maintenance issues. Thus, improved designs offer a number of advantages.

Figure 3:
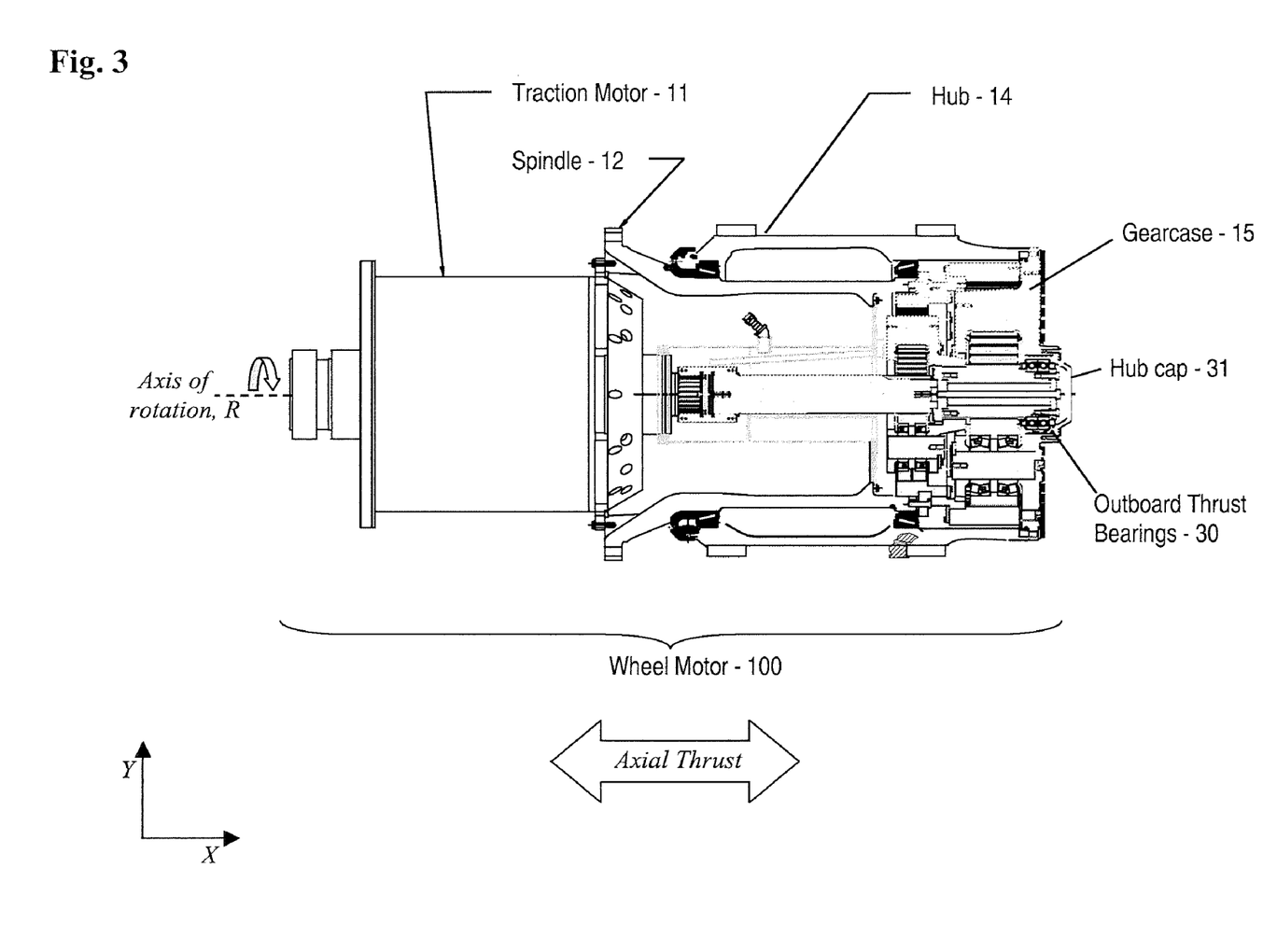
FIG. 3 is a cross-sectional view of a wheel motor according to the present invention.

Turning to FIG. 3, there is shown an embodiment of an improved wheel motor 100. The improved wheel motor 100 includes a traction motor 11, a spindle 12 and a hub 14 and other such components. A gearcase 15 is included that has significant modifications over the prior art. One of the modifications to the gearcase 15 is in the form of an "outboard thrust bearing assembly" that provides users with a number of advantages.

The gearcase 15 of the improved wheel motor 100 includes an installation of outboard thrust bearings 30. The outboard thrust bearings 30 are easily and quickly accessed by users, and may be quickly maintained. Advantageously, the thrust bearings used in the outboard thrust bearing assembly are all disposed within an "outboard" region, or an area of the gearcase 15 that provides users with uncomplicated access while in the field.

Figure 4:
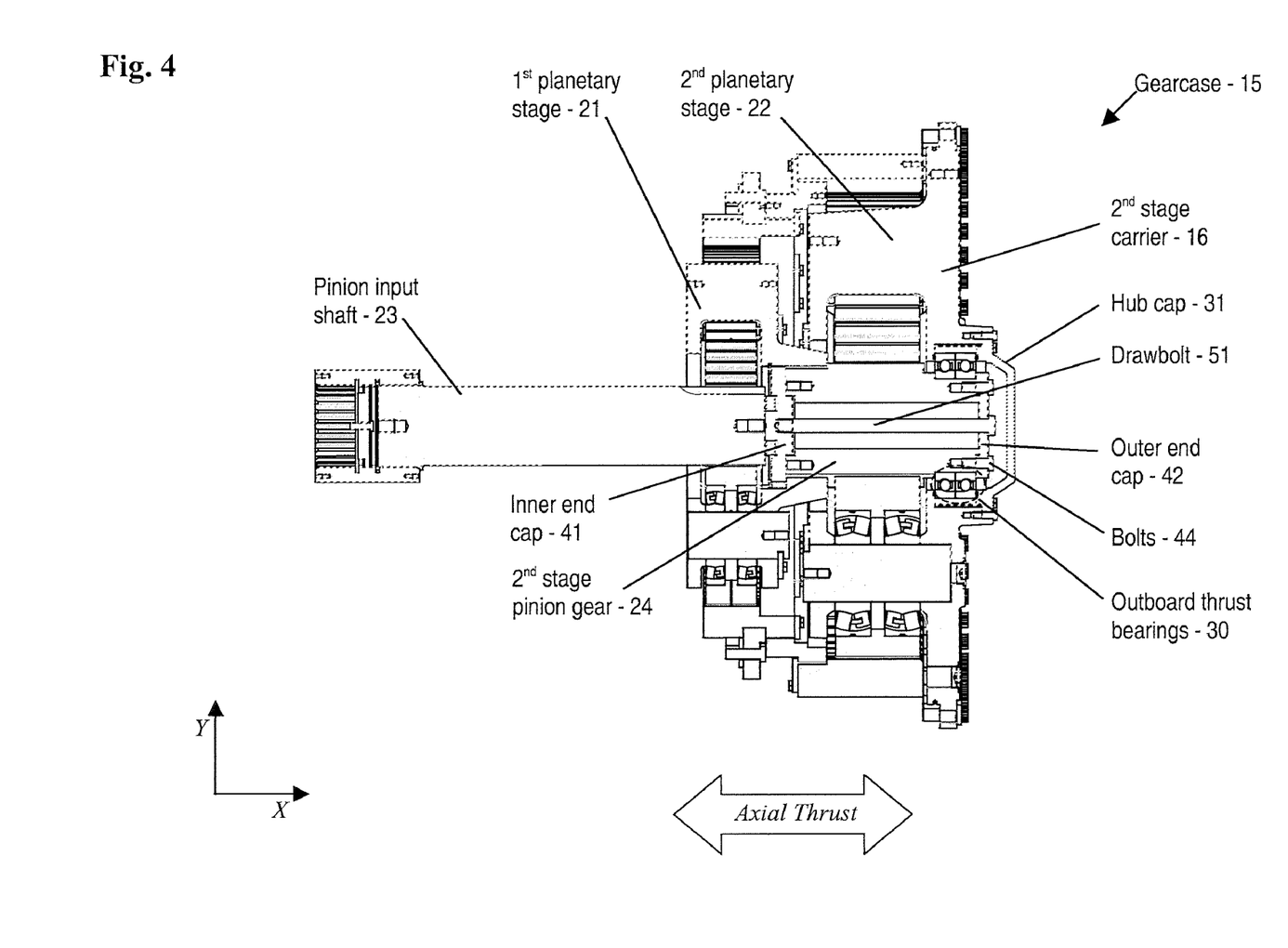
FIG. 4 is a partial cross-sectional view of a gearcase of an embodiment of the wheel motor.

Looking more closely now at the improved wheel motor 100, and considering FIGS. 3 and 4, an exemplary embodiment of the improved wheel motor 100 is shown. In this example, the traction motor 11 includes a shaft that is axially connected to the gearcase by means of a pinion input shaft 23. As the input shaft 23 rotates, torque is transmitted to a first stage planetary gear assembly 21. The first stage planetary gear assembly 21 amplifies the torque (also reduces the speed) and transfers that torque to the second stage planetary gear assembly 22. Torque from the second stage planetary gear assembly 22 is transferred to the hub 14, which rotates about the spindle 12. Tires and rims (not shown) are fastened to the hub 14.

As shown in FIG. 4, at a center of the second stage planetary gear assembly 22 is a second stage pinion gear 24. The second stage pinion gear 24 includes an inner end cap 41 disposed on an inner side, and an outer end cap 42 disposed on an outer side. A draw bolt 51 is disposed through a center of the second stage pinion gear 24 and secures the inner end cap 41 to the outer end cap 42, essentially providing a "clamping" force.

Each of the end caps 41, 42 are secured to the second stage pinion gear 24 by the clamping force. In addition, in some embodiments, a plurality of bolts 44 may be disposed about a circumference of the outer end cap 42, and thus secured to the second stage pinion gear 24. Between a second stage carrier 16 of the second stage planetary gear assembly 22 and the outer end cap 42 as well as the second stage pinion gear 24, is at least one race of outboard thrust bearings 30. The outboard thrust bearings 30 are generally secured into place between the three components. More specifically, the outboard thrust bearings 30 are disposed about a circumference of a terminal end of the second stage pinion gear 24, are mounted into a central area of the second stage carrier 16 and secured in place by the outer end cap 42. Some degree of radial translation of the outboard thrust bearings 30 (for example, in the Y-direction, or otherwise about the X-axis), may be provided for as deemed appropriate.

Note that generally throughout this disclosure, a review of components is provided starting from the left (origin in the X-direction), and ending on the right. For convention, the left side or portion is referred to as "inner" while the right side, which is exposed during operation, is referred to as "outer." Movement along the X-axis is considered "axial," and may be "inward" or "outward," while movement along the Y-axis (and axes orthogonal to the X-axis) is considered "radial."

Collectively, the inner end cap 41, the outer end cap 42, the draw bolt 51 and the outboard thrust bearings 30 are referred to as an "outboard thrust bearing assembly." Of course, it is understood that other certain components (e.g., the second stage pinion gear 24) are or may be included. Accordingly, this convention is general, and not limiting of the invention.

In this example, the inner end cap 41 includes a threaded center for receiving the draw bolt 51. Accordingly, the draw bolt 51 may be inserted through the outer end cap 42 and tightened, such as with a socket wrench, such that an appropriate amount of torque is applied. The inner end cap 41 and the outer end cap 42 may be fabricated by casting, machining or other similar processes. In some embodiments, and as discussed in FIGS. 5 and 6, the inner end cap 41 and the outer end cap 42 may include additional sub-components.

Further, a hub cap 31 is included. The hub cap 31 is generally set with an appropriate O-ring, to prevent leakage of lubricant from the gearcase 15 and intrusion of foreign material. Further, in some embodiments and such as the one shown in FIG. 4, the hub cap 31 may limit axial movement of the outboard thrust bearings 30.

In general, the outboard thrust bearings 30 are provided by use of bearings that can withstand extreme loading. Examples of thrust bearings 30 are provided in FIG. 7, and discussed further herein.

Figure 5:
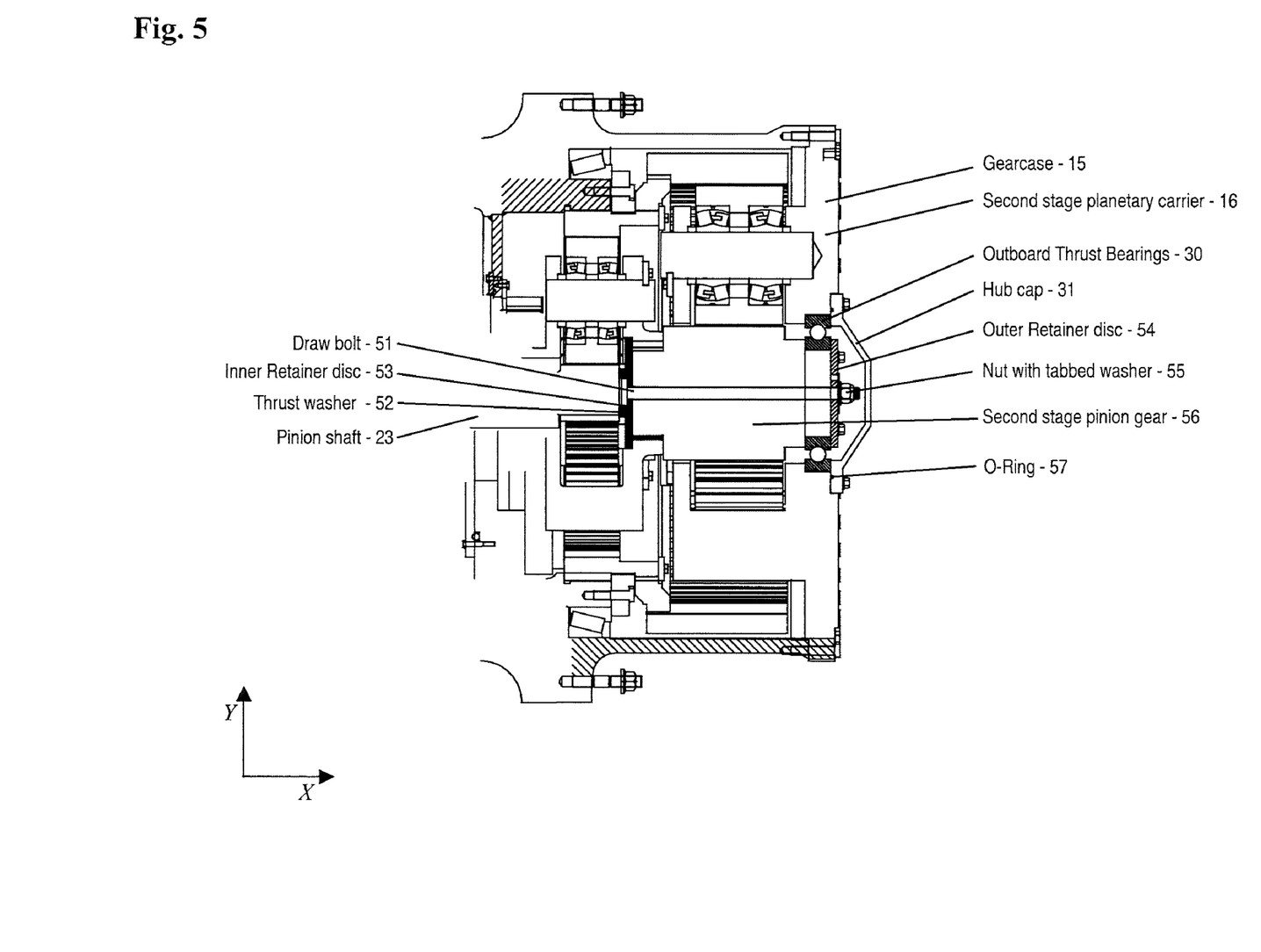
FIGS. 5 and 6 are cross-sectional views of additional embodiments of the gearcase.
Figure 6:
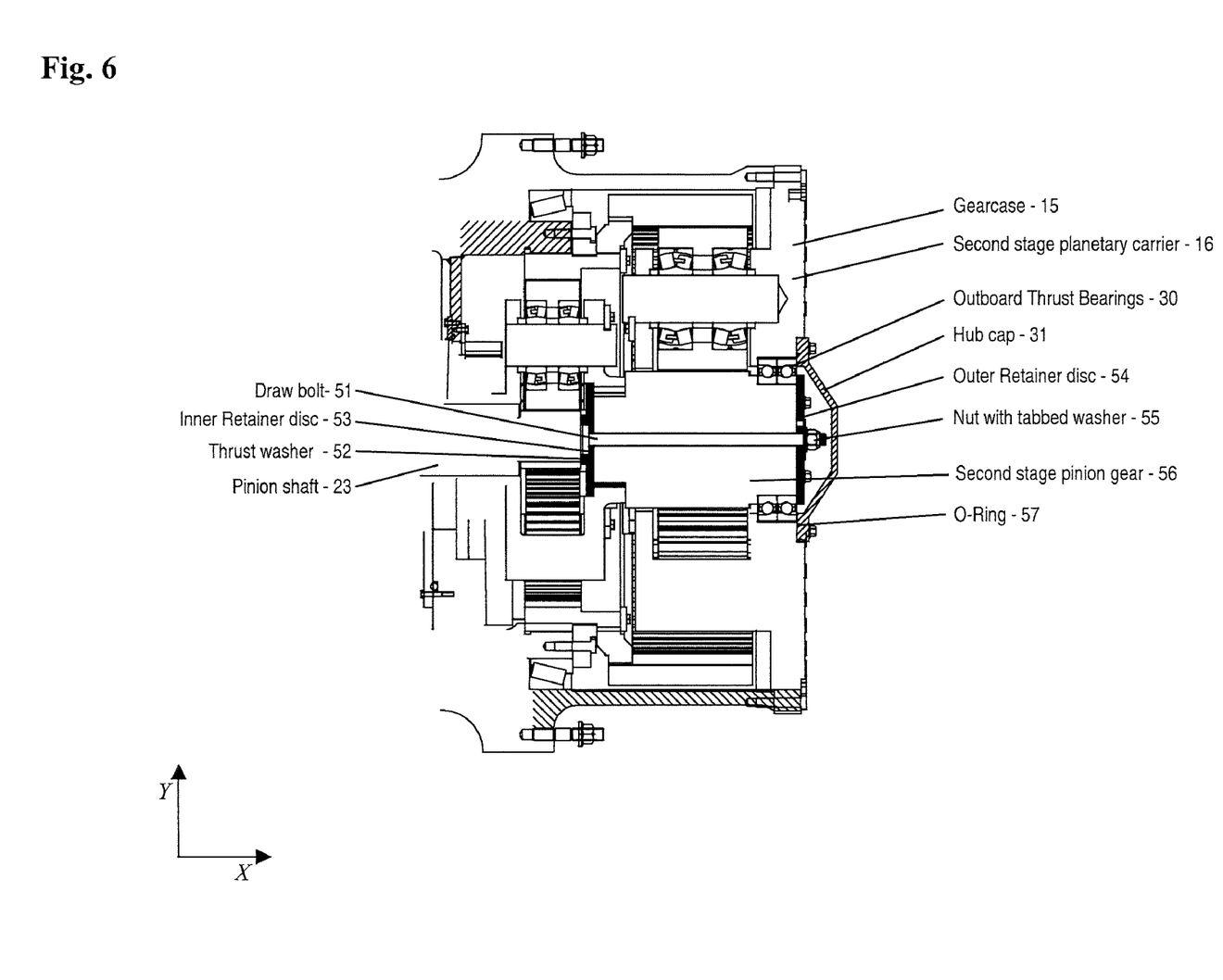

In some embodiments, and also as shown in FIG. 4 (and FIG. 6), the outboard thrust bearing assembly includes two races of thrust bearings. Accordingly, the outboard thrust bearing assembly is well equipped to absorb or limit inward or outward axial thrust. Turning now to FIGS. 5 and 6, additional embodiments are provided.

Referring now to FIG. 5, an additional embodiment of the improved wheel motor 100 is shown. A key feature of this non-limiting example is that a direction of the drawbolt 51 is reversed from that depicted in FIGS. 3 and 4. That is, a head of the draw bolt 51 is located at the inner end cap 41, while an end of the draw bolt 51 is secured with a nut and washer 55. On the inner side, the draw bolt 51 is generally surrounded by a thrust washer 52. The thrust washer 52 is generally of a thickness that is equivalent to a thickness of the head of the draw bolt 51. The thrust washer 52 generally serves to minimize drag in rotation of the draw bolt 51, and to maintain secure positioning. In some embodiments, the thrust washer is fabricated from bronze or other metals having similar properties. The thrust washer 52 provides a positive stop surface for the first stage input pinion shaft 23, as the pinion floats axially. It should be noted that the surfaces facing the thrust washer 52 rotate at different speeds (i.e.; by the gear ratio of the first stage). Accordingly, embodiments of appropriate thrust washers 52 generally account for such dynamic forces.

The thrust washer 52 and the draw bolt 51 are generally secured into axial positioning by an inner retainer disc 53. The inner retainer disc 53 is generally secured to the second stage pinion gear 56 by use of bolts that pass through a periphery of the inner retainer disc 53.

Turning now to the outer components, the draw bolt 51 passes from through the second stage pinion gear 56 into at least one set of outboard thrust bearings 30. The outboard thrust bearings 30, or simply the "thrust bearings," carry the draw bolt 51 while providing limitations upon axial deflection within the gearcase 15. Generally, the thrust bearings 30 are disposed into the second stage planetary carrier 16 in a conventional manner for mounting of thrust bearings. For example, the thrust bearings 30 may be securely fit into an appropriately sized recess of the second stage planetary carrier 16. Once in place, the thrust bearings 30 are generally secured using an outer retainer disc 54. The outer retainer disc 54 may be bolted to the second stage planetary carrier 16 around at least one of the periphery and a central portion of the outer retainer disc 54. Generally, the draw bolt 51 protrudes through a center of the outer retainer disc 54 and is secured by use of a nut and tabbed washer 55 (or by an equivalent type of securing). The hub cap 31 is provided to safeguard the components from damage arising from external forces. In addition, an O-ring 57 may be placed under the hub cap 31.

FIG. 6 depicts an embodiment of the gearcase 15 according to the present invention that is similar to the embodiment provided in FIG. 5. Note that in FIG. 6, the thrust bearings 30 includes two sets of bearings. In this embodiment, the thrust bearings 30 are set to absorb or limit axial thrust in opposing directions.

The embodiments provided, one or two thrust bearings are located on an outboard side of the gearcase 15 (additional races of thrust bearings may be included as desired). Instead of locating the thrust bearings within the gear train, the thrust bearings are embedded into the second stage planetary carrier. Thus, the thrust bearings 30 can be readily accessed by removal of the hub cap 31. In operation, thrust generated by both the first set of planetary gears 21 and the second set of planetary gears 22 is controlled by the outboard thrust bearings 30. Note that there could be one or two (or more) races of thrust bearing, depending upon, for example the type of bearing selected, load that is experienced and other such factors. In operation, axial thrust generated towards the outboard side of the wheel is passed through the second stage pinion to the outboard thrust bearings 30. Axial thrust generated in the opposite direction is resisted by the draw bolt 51, in combination with the retainer discs 53, 54. The draw bolt 51 clamps both planetary races together so thrust in either direction is applied to the outboard thrust bearings 30.

Figure 7A:
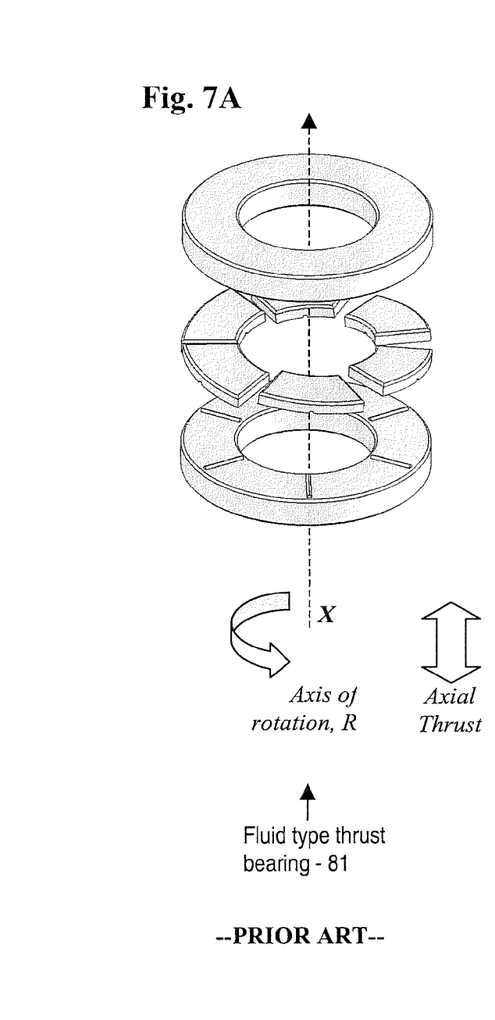
FIGS. 7A through 7C, collectively referred to herein as FIG. 7, depict embodiments of prior art thrust bearings.
Figure 7B:
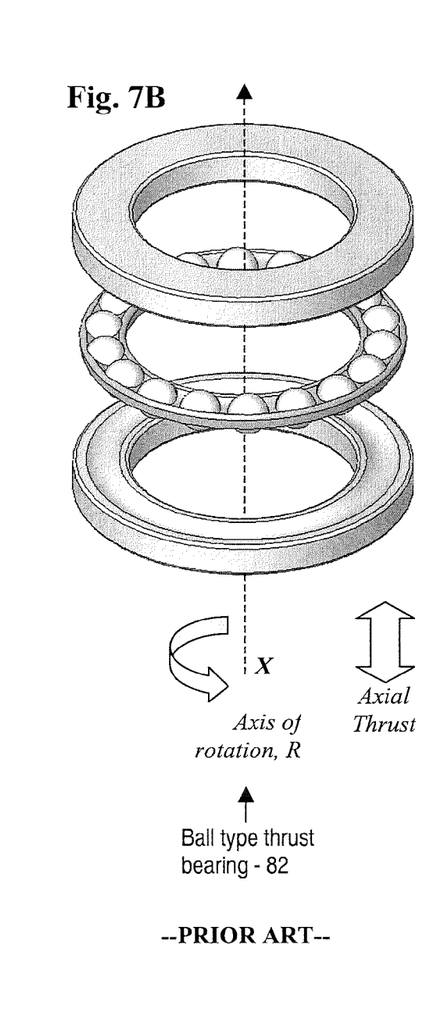
Figure 7C:
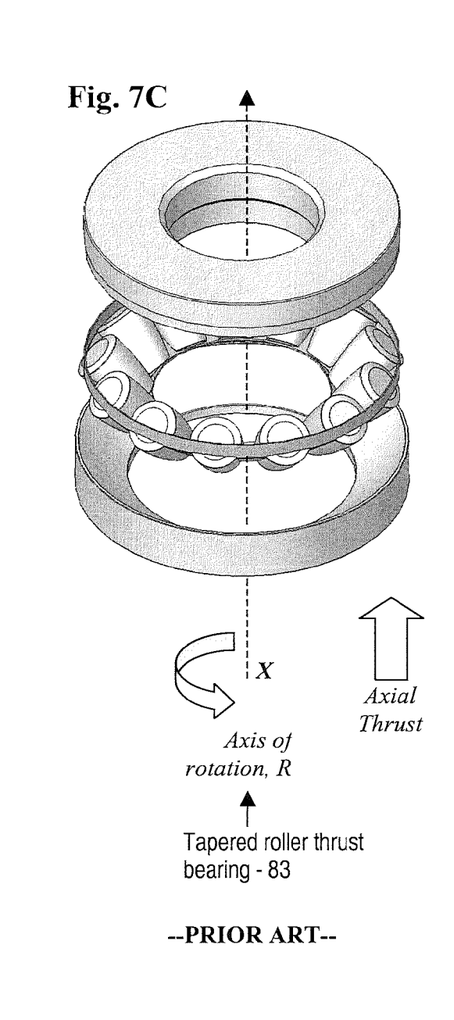

FIGS. 7A through 7C, collectively referred to as FIG. 7, depict aspects of prior art thrust bearings as might by used in the improved wheel motor 100. In FIG. 7A, a fluid type of thrust bearing is shown. In the fluid type thrust bearing 81, axial thrust is supported on a thin layer of pressurized liquid and consequently low drag is achieved. In FIG. 7B, a ball type thrust bearing 82 is shown. Ball thrust bearings, composed of ball bearings supported in a ring, are generally used in low thrust applications where there is little radial load. In FIG. 7C, a tapered roller bearing 83 is shown. Tapered roller bearings generally include tapered rollers arranged so that their axes all converge at a point on the axis of the bearing. A length of the roller and the diameter of the wide and the narrow ends is carefully calculated to provide the correct taper so that each end of the roller rolls smoothly on the bearing face without skidding.

In general, the outboard thrust bearing assembly makes use of ball thrust bearings and/or tapered roller bearings. However, other types of thrust bearings may be used.

Thrust generated by the input pinion shaft toward the outboard side of the wheel is transmitted through the thrust washer and then through the second stage planetary to the outboard thrust bearings 30, which then limit the axial thrust. Axial thrust in the inward direction is transmitted to the inner end cap 41, which pulls the draw bolt 51 inward. The inward pulling is limited by the outer end cap 42, which communicates the inward thrust to the outboard thrust bearings 30. In some embodiments, thrust generated by the input pinion shaft is very small compared to the balance of the geartrain and is generally ignored. In general, the input pinion shaft floats axially in its position to allow for thermal expansion. That is, for example, it should be noted that the input pinion shaft 23 generally includes a small amount of axial float in order to avoid harmful loading to the bearings due to differential thermal expansion.

Note that in general, the thrust bearings may be selected to allow easy, external removal and replacement due to accessibility on the outboard end of the gearcase 15. In addition, sizing and selection of the thrust bearings and other components may be performed with consideration for allowing removal of the second stage pinion gear 56 with the outboard thrust bearing assembly so that a disabled vehicle 1 can be towed without spinning the gearing and the traction motor 11. The embodiments provided herein accommodate such removal.

In some embodiments, the outboard thrust bearings 30 float radially (such that radial loading of the thrust bearings may be reduced or avoided), yet are fitted to take axial thrust in either direction along the X axis. In some embodiments, installation of the draw bolt 51 may be reversed and the surrounding parts slightly modified. Some of the resulting differences can be seen by comparing FIGS. 5 and 6 with FIGS. 3 and 4.

Having thus described aspects of the invention, certain advantages should be noted. Some of the advantages include limitation of wear on thrust bearing as the outboard bearings have low speed due to positioning and a simple design that is easier to manufacture, and therefore less costly. For example manufacture is simplified and therefore more economic as a result of: avoidance of a requirement for a thrust resisting gearcase bulkhead, which also provides for ease of manufacture; requirements for precision of manufacture within the gearcase are reduced; modular construction of the planetary sets is realized; fewer parts in the whole gearcase; simple installation with less risk of assembly error. In addition, exter- nal access to the thrust bearings is feasible, therefore providing for more effective monitoring of bearing condition, and thrust bearings are insulated from radial loading.

Of course, the teachings herein are merely an introduction to aspects of the improved wheel motor 100. Other embodiments may be had. As one example, the improved wheel motor 100 may include one or more sets of thrust bearings (such as, for example, fluid type thrust bearings 81), in place of, or in addition to the thrust washer 52.

Having thus disclosed aspects of the low maintenance wheel motor 100, it should be recognized that any number of tires may be mounted and used with the improved wheel motor 100. The low maintenance wheel motor 100 may be used with any of a variety of types of vehicles. Further, aspects the improved wheel motor 100 disclosed herein may be used with other types of propulsion. For example, components of or residing in the gearcase 15 as described herein may be used with any type of propulsion (such as differential, hydraulic and others) where limiting axial thrust is desired.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An outboard thrust bearing assembly comprising:
   an inner end cap, an outer end cap, and a race of thrust bearings;
   a drawbolt for clamping the inner end cap to the outer end cap and about a pinion gear of a planetary gear, wherein the race of thrust bearings is retained in place by the outer end cap, the pinion gear, a planetary gear carrier and a hub cap.

2. The assembly as in claim 1, wherein the pinion gear and the planetary gear carrier are comprised within a secondary stage planetary gear.

3. The assembly as in claim 1, wherein at least one of the inner end cap and the outer end cap comprise through ways for bolting to the pinion gear.

4. The assembly as in claim 1, wherein the inner end cap comprises at least one of a thrust washer and a retainer disc.

5. The assembly as in claim 1, wherein the inner end cap comprises a threaded center for receiving the drawbolt.

6. The assembly as in claim 1, wherein the outer end cap comprises a retainer disc.

7. The assembly as in claim 6, wherein the outer end cap further comprises a nut and washer for securing a terminal end of the drawbolt.

8. The assembly as in claim 1, wherein the thrust bearings comprise at least one of a ball type bearing and a roller type bearing.

9. The assembly as in claim 1, further comprising an O-ring for seating the hub cap.

\* \* \* \* \*